United States Patent
Koyama

(10) Patent No.: US 6,574,076 B1
(45) Date of Patent: Jun. 3, 2003

(54) PIVOT ASSEMBLY FOR DRIVING A MAGNETIC HEAD

(75) Inventor: Toshisada Koyama, Kitasaku-gun (JP)

(73) Assignee: Minebea Co., Ltd., Nagano-Ken (JP)

( * ) Notice: Subject to any disclaimer, the term of this patent is extended or adjusted under 35 U.S.C. 154(b) by 126 days.

(21) Appl. No.: 09/662,112

(22) Filed: Sep. 14, 2000

(30) Foreign Application Priority Data

Sep. 14, 1999 (JP) .............................. 11-260263

(51) Int. Cl.[7] ................................ G11B 5/53
(52) U.S. Cl. .................................. 360/265.3
(58) Field of Search ................. 360/265.2, 265.3; 384/477, 480, 489, 490, 510, 543, 548, 559, 569, 586, 587; 310/90, 67 R

(56) References Cited

U.S. PATENT DOCUMENTS

| | | | |
|---|---|---|---|
| 5,381,066 A | * | 1/1995 | Miyaji et al. ............... 310/90 |
| 5,416,657 A | * | 5/1995 | Beck et al. ............. 360/265.3 |
| 5,552,650 A | * | 9/1996 | Cap et al. ................. 277/419 |
| 5,596,235 A | * | 1/1997 | Yazaki et al. ............. 310/67 R |

FOREIGN PATENT DOCUMENTS

| | | | |
|---|---|---|---|
| EP | 0910080 A2 | * | 4/1999 |
| GB | 2041111 A | * | 9/1980 |
| GB | 2194601 A | * | 3/1988 |
| GB | 2225066 A | * | 5/1990 |
| JP | 7-087697 A | * | 3/1995 |
| JP | 7-182770 A | * | 7/1995 |
| JP | 07-194046 A | * | 7/1995 |
| JP | 08-087824 A | * | 4/1996 |
| JP | 10-229659 A | * | 8/1998 |

OTHER PUBLICATIONS

"Oil retention Cap", May 1, 1996, IBM TDB, vol. 39, Issue No. 5, pp. 117–118.*

* cited by examiner

Primary Examiner—William Klimowicz
(74) Attorney, Agent, or Firm—Oliff & Berridge, PLC.

(57) ABSTRACT

A pivot assembly for sustaining a magnetic head, a head suspension and an actuator block pivotally parallel to magnetic disks oscillates slowly. Hence the invention has been made in light of examining a sealing structure for retaining sufficient capability of preventing a leakage of lubricant and retaining sufficient capability of preventing a contamination of lubricant, characterized in that retaining required sealing capabilities, an annular shield plate is secured to the shaft, achieving pivot assembly manufacturing cost by reducing machining process and a number of sealing members.

2 Claims, 4 Drawing Sheets

PIVOT ASSEMBLY FOR DRIVING A MAGNETIC HEAD

BACKGROUND OF THE INVENTION

1. Field of Invention

The present invention relates to a pivot assembly for sustaining magnetic heads, head suspensions and an actuator block pivotally parallel to magnetic disks in a hard disk drive.

2. Description of Related Art

A hard disk drive is formed, as shown in FIG. 3 in general, by disposing a plurality of magnetic disks D on a rotary axis $C_1$ at a given spacing and arranging them in such a manner as these are driven to rotate in a unitary manner by a spindle motor not shown, while an actuator block (swing arm) 2 to support a plurality of head suspensions 1, on each tip end of which a magnetic head is mounted, being pivoted in multiple steps on a pivot assembly 3 having a pivotally axis $C_2$ parallel with the rotary axis $C_1$ and, by generating a voice coil motor not shown but disposed on a proximal end 2a side of the actuator block 2, the actuator block 2 is made to swing on the pivotally axis $C_2$ to access the magnetic head to a desired position of the magnetic disk D.

Here, the above pivot assembly 3, as shown in FIG. 4, comprises a hollow shaft 4 disposed at a pivoting center (pivotally axis $C_2$) of the actuator block 2 and a sleeve 7 which is coupled with the shaft 4 pivotally and provides its outer diameter surface as a peripheral face to couple the actuator block 2 through a pair of rolling bearings 5, 6. The pair of rolling bearings 5, 6 are positioned in an inner diameter 7a having a large diameter formed at both ends of the sleeve 7 and coupled in the respective positions to the sleeve 7. While, the sleeve 7 is fixed in its axial-directional position by making the one side (lower end side) rolling bearing 6 seated on a flange portion 4a to the shaft 4. Now, the shaft 4 is adapted to be fixed in its position by making use of an internal thread 4b to a housing (not shown) of the hard disk drive.

Now, the rolling bearings 5 and 6 have such constitution in general as a plurality of balls 13 are interposed between a raceway of an inner ring 11 and a raceway surface of an outer ring 12 and the balls are adapted to be distributed by same spacing between each other on the circumferential direction by a retainer (not shown), however, in terms of using the above rolling bearing for sustaining a consistent rotational load, in order to guarantee a stable rotating accuracy, on both sides within the spacing between the inner ring 11 and the outer ring 12 a sealing member 14 such as a shield plate and seal plate or a doubled seal formed by being doubled with seal plates (in figure, a shield plate is shown) is disposed in order to prevent a leakage of a lubricant toward outside the rolling bearing and/or in order to prevent contamination of a lubricant by foreign material from outside the rolling bearing.

However, according to the use of the rolling bearings 5, 6 with the sealing member 14, to form a circumferential groove 15 (the circumferential groove provided in an inner diameter surface of the outer ring 12) for coupling and holding a shield plate or seal plate on the inner diameter surface of the outer ring 12 or instead of the circumferential groove 15, a circumferential groove on the outer diameter surface(not shown) of the inner ring 11 requires machining process. Also, by the sealing member 14 such as the shield plate or the seal plate and disposing the sealing member 14 process on the circumferential groove 15, manufacturing cost is increased, causing an increase of the manufacturing cost of the pivot assembly for a hard disk drive.

The invention has been made to be improved of the above problem. The purpose thereof is to retaining sealing capability and achieving a cost reduction in general, by simplifying the sealing structure and reducing a number of the sealing member for the rolling bearing, thereby to provide a pivot assembly contributing to the cost reduction of the hard disk drive.

SUMMARY OF THE INVENTION

A pivot assembly for sustaining magnetic heads, head suspensions and an actuator block pivotally parallel to magnetic disks oscillates slowly. Hence the invention has been made in light of examining a sealing structure for retaining sufficient capability of preventing a leakage of lubricant and retaining sufficient capability of preventing a contamination of lubricant, characterized in that retaining required sealing capabilities, an annular shield plate is secured to the shaft, achieving pivot assembly manufacturing cost by reducing machining process and a number of sealing members.

That is, the constitutional feature of the present invention resides in that, in a pivot assembly which comprises a shaft disposed at the pivoting center of the actuator block to support the head suspensions to be provided with magnetic heads and a sleeve which is mounted pivotally on the shaft through a pair of rolling bearings and provides the outer diameter surface as a coupling surface for the actuator block, an open bearing as sealing member-less rolling bearing is used and the shaft to be used to secure an annular shield plate forming a tiny gap between both an outer ring end face and an inner ring end surface at each opening end of open bearing.

In the pivot assembly thus formed, since the shield plate seals an opening end of the open bearing by the function mentioned above, a circumferential groove 15 in the inner diameter surface of the outer ring 12, the mounting of the sealing member, such as shield plate or seal plate and the assembly process of the sealing member into the bearing, become unnecessary.

The invention still requires a sealing plate to every open bearing to prevent the leakage of lubricant toward outside the rolling bearing and/or to prevent contamination of a lubricant by foreign material from outside the rolling bearing, eliminating the circumferential groove and reducing the number of sealing member contribute to a cost reduction. A further embodiment characterized in that where the shaft has a flange portion to support one of the open bearing and a radially extending portion functions as the shield plate, having gaps between the outer ring end surface, thus reducing one more shield plate.

DETAILED DESCRIPTION OF PREFERRED EMBODIMENTS

Hereinafter, an embodiment of the present invention is explained referring to the attached drawings.

Figure 1:
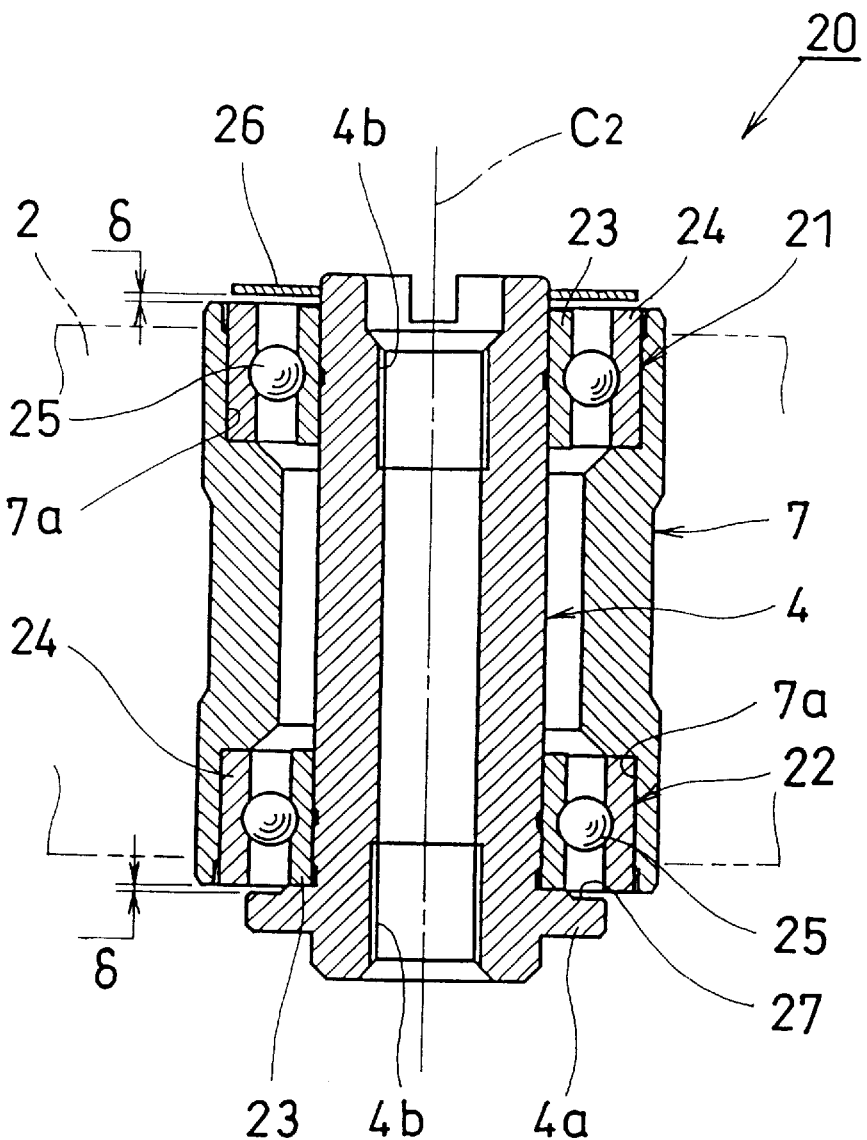
FIG. 1 is a sectional view showing the structure of the pivot assembly of the first embodiment of the invention.
Figure 3:
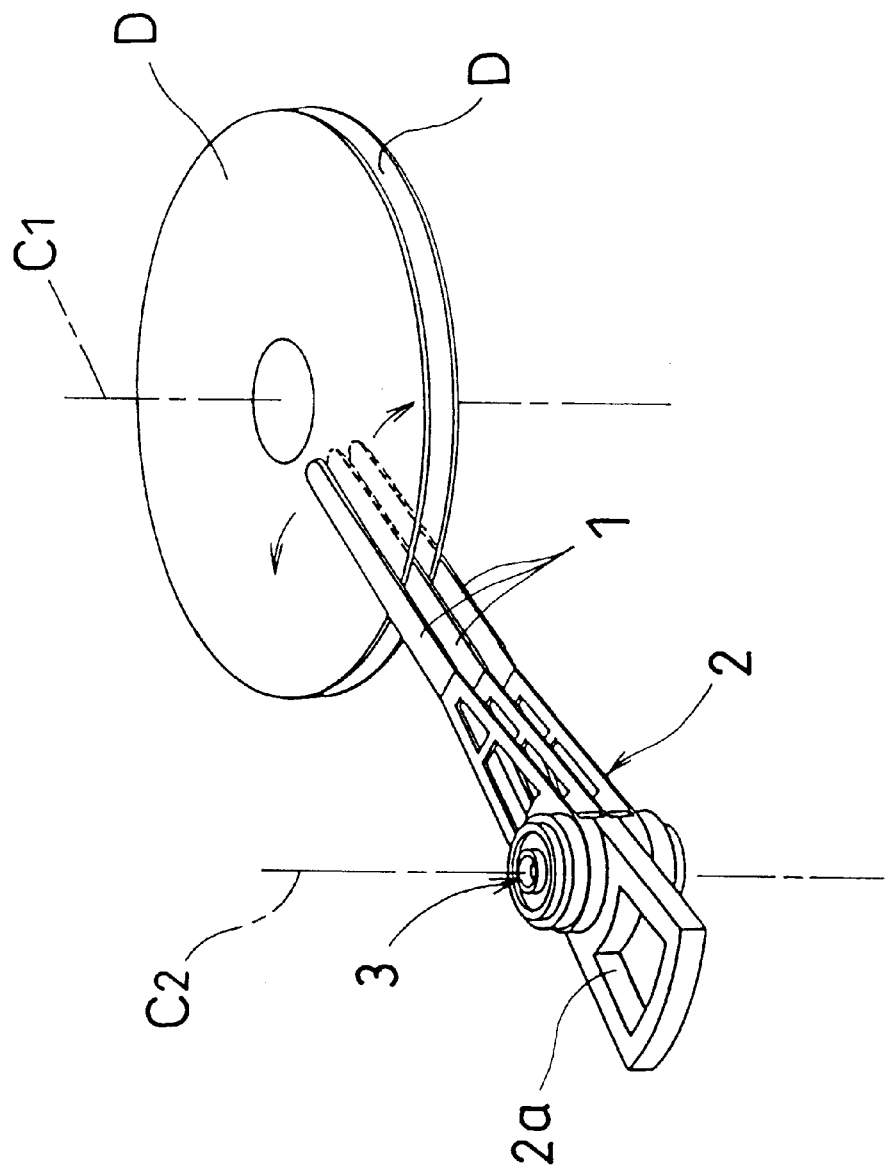
FIG. 3 is a schematic diagram showing the basic structure of a hard disk drive applied by the pivot assembly of the present invention.
Figure 4:
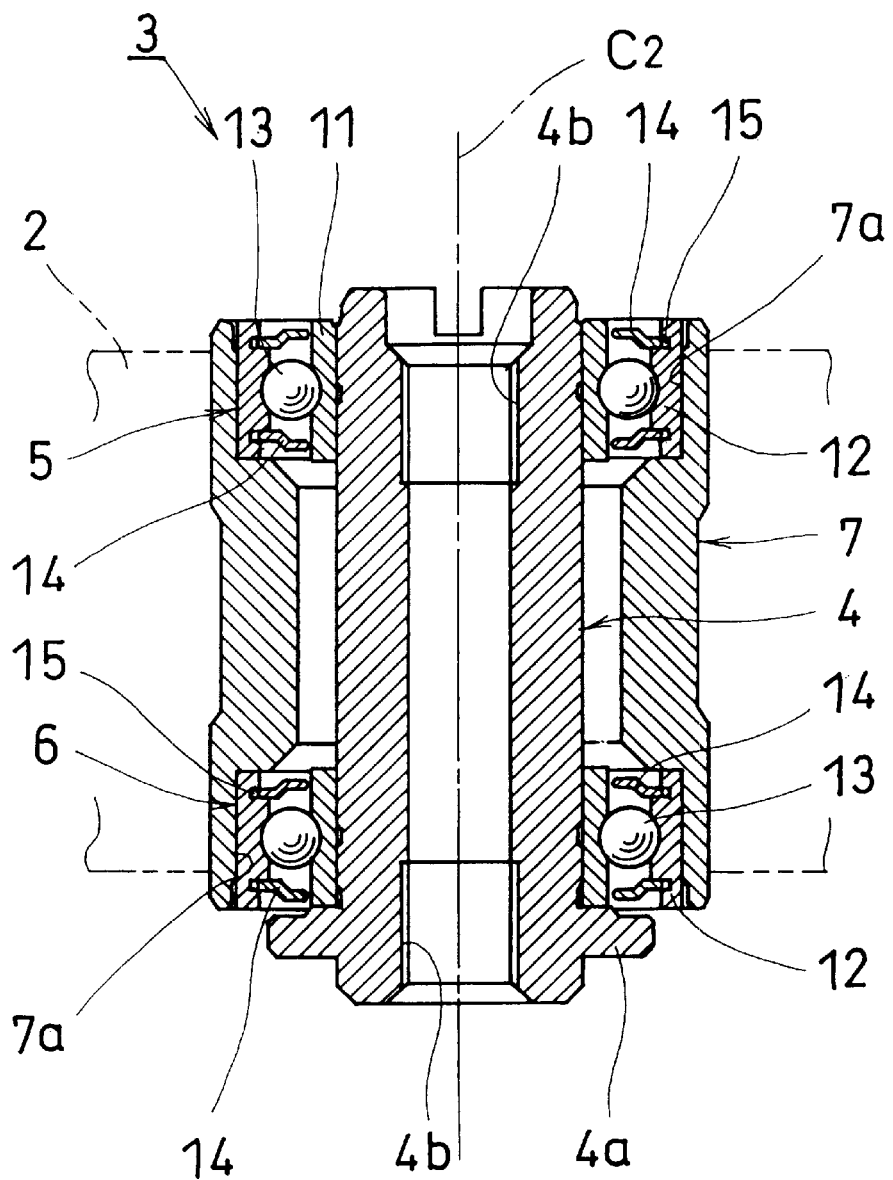
FIG. 4 shows a structure of a conventional pivot assembly.

FIG. 1 is to show a pivot assembly of the present invention. For reference, a pivot assembly 20 is what is applied to the hard disk drive (FIG. 3), and a conventional structure is identical with what is shown in FIG. 4, so that the identical signs are used to the identical portions and their explanations are omitted. In a present pivot assembly 20, as a rolling bearing which is interposed between a shaft 4 and a sleeve 7 open bearings 21,22 without a sealing member 14 (FIG. 4) are used, accordingly on the outer diameter surface of an inner ring 23 and the inner diameter surface of an outer ring 24 a raceway for a ball 25 is formed.

On the upper end of the shaft 4, an annular shield plate 26 is secured to the shaft 4 by interference fit by means of pressing the shield plate toward bearing and set at predetermined position. The shield plate 26 has a sufficient radially extending diameter to form a gap δ (as one practical example of a gap is 0.02–0.50 mm) between the inner ring 23 end surface and the outer ring 24 end surface of the open bearing 21. The method for securing the shield plate 26 to the shaft 4 by interference fit is preferred. On the other hand, a flange portion 4a of the shaft 4 to support the inner ring 23 end surface of the open bearing 22 has a radially extending portion to form a gap β between the outer ring 24 end surface and cover the opening end of the other open bearing 22.

In the first embodiment, since the shield plate 26 secured to the one end of the shaft 4 and the flange portion 4a of the shaft 4 seals the opening ends of bearing 21 and 22, the leakage of the lubricant toward outside the rolling bearing and/or contamination of a lubricant by foreign material from outside the rolling bearing, are prevented. Accordingly, since every open bearing 21, 22 does not have the sealing member 14 (FIG. 4) such as shield plate and seal plate, a number of sealing member 14 is reduced, the machining process of the circumferential groove 15 for coupling and holding the sealing member 14 become unnecessary.

Figure 2:
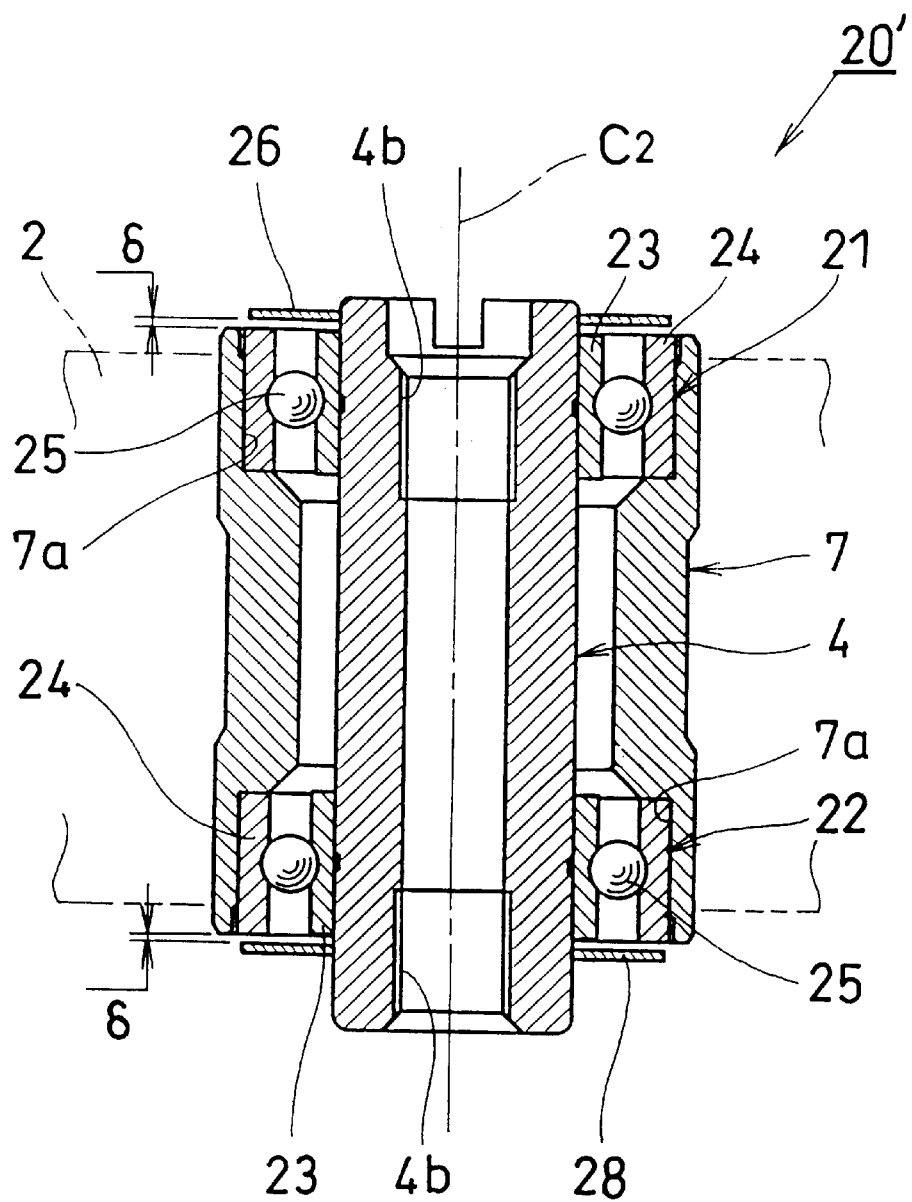
FIG. 2 is a sectional view showing the pivot assembly of the second embodiment of the invention.

FIG. 2 is to show the second embodiment of the present invention as a pivot assembly 20' for driving a magnetic head. In the second embodiment, a straight shaft 4, without flange portion 4a is introduced. The opening ends of bearing 21 and 22 are sealed by the shield plate 26 and an annular shield plate 28. Same as the shield plate 26, the shield plate 28 is secured to the shaft 4 by interference fit by means of pressing the shield plate toward bearing and set at predetermined position and has a sufficient radially extending diameter to form a gap δ (as one practical example of a gap is 0.02–0.50 mm) between the inner ring 23 end surface and the outer ring 24 end surface of the open bearing 22. The method for securing the shield plate 28 to the shaft 4 by interference fit is also preferred.

In the second embodiment, since two sealing plates 26, 28 function as a labyrinth to seal every opening of the open bearings 21, 22, the leakage of the lubricant toward outside the rolling bearing and/or contamination of a lubricant by foreign material from outside the rolling bearing, are prevented. In this second embodiment, since an additional sealing plate 28 to the first embodiment is to be prepared, the flange portion 4a in the first embodiment can be eliminated.

As explained above, according to the pivot assembly for magnetic head drive, since an open bearing is used as a rolling bearing and is sealed from the outside thereof like a labyrinth, retaining sealing capability and achieving a cost reduction in general, by simplifying the sealing structure and reducing a number of the sealing member for the rolling bearing, thereby to provide a pivot assembly contributing to the cost reduction of the hard disk drive.

What is claimed is:

1. A pivot assembly unit for sustaining a magnetic head, a head suspension and an actuator block pivotally parallel to a single rotating disk or plurality of rotating disks, wherein a straight shaft is arranged at the center by means of a pivot, a sleeve being coupled to the shaft pivotally through a pair of rolling bearings and having an outer diameter surface as a peripheral face coupled to the actuator block, the pivot assembly unit is characterized in that the pair of bearings have no sealing member, each of an annular shield plate is secured to the shaft toward the bearing, by means of both opening ends of the bearing, at least one annular shield plate being secured to the shaft by an interference fit, and at least one annular shield plate has a gap between an inner ring of the bearing and an outer ring of the bearing.

2. A pivot assembly unit for sustaining a magnetic head, a head suspension and an actuator block according to claim 1, characterized in that the straight shaft comprises a flange portion for supporting the inner ring of one of the bearings, with a radially extending portion that functions as the shield plate, having gaps between the outer ring.

* * * * *